(12) United States Patent
Evans et al.

(10) Patent No.: US 10,875,784 B1
(45) Date of Patent: Dec. 29, 2020

(54) FERROELECTRIC PARTICLES CONTROLLED BY FUNCTIONAL COATINGS

(71) Applicant: Government of the United States, as represented by the Secretary of the Air Force, Wright-Patterson AFB, OH (US)

(72) Inventors: Dean R. Evans, Beavercreek, OH (US); Yuri Barnakov, Nashville, TN (US); Ighodalo U. Idehenre, Tipp City, OH (US); Sergey A. Basun, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 46 days.

(21) Appl. No.: 16/431,774

(22) Filed: Jun. 5, 2019

Related U.S. Application Data

(60) Provisional application No. 62/681,695, filed on Jun. 7, 2018.

(51) Int. Cl.
*C01G 23/00* (2006.01)
*B82Y 40/00* (2011.01)
*B82Y 30/00* (2011.01)

(52) U.S. Cl.
CPC ............ *C01G 23/006* (2013.01); *B82Y 30/00* (2013.01); *B82Y 40/00* (2013.01);
(Continued)

(58) Field of Classification Search
CPC ...... C01G 23/006; B82Y 30/00; B82Y 40/00; C01P 2002/82; C01P 2004/64; C01P 2006/40
See application file for complete search history.

(56) References Cited

U.S. PATENT DOCUMENTS 9,083,149 B1 * 7/2015 Cook .................... H01S 3/2308

OTHER PUBLICATIONS

Adireddy, S. et al., Solution-Based Growth of Monodisperse Cube-like BaTiO3 Colloidal Nanocrystals, Chem. Mater. 2010, 22, 1946-1948.

(Continued)

*Primary Examiner* — James A Fiorito
(74) *Attorney, Agent, or Firm* — AFMCLO/JAZ; Timothy Barlow

(57) ABSTRACT

A method for synthesizing ferroelectric nanoparticles comprises introducing solutions of $Ba(NO_3)_2$ (1 mmol) in 5 ml of deionized water, NaOH (12.5 mmol) in 5 ml of deionized water, Ti(IV) n-butoxide (1 mmol) in 5 ml of 1-butanol, 2.5 ml of oleic acid, and 5 ml of 1-butanol into a Teflon-lined autoclave vessel; heating the vessel to 135° C. for 18 h, resulting in barium titanate nanoparticles; and ball-milling the barium titanate nanoparticles in a solution of oleic acid and heptane to create a colloidal suspension of nanoparticles. The weight ratio of barium titanate:oleic acid:heptane is 1:1:20. The ball-milling step may further comprise introducing a slurry comprising 0.1 g of synthesized $BaTiO_3$ nanocubes, 0.1 g of oleic acid, and 15 mL of heptane into a ball-mill crucible filled with 2 mm $ZrO_2$ balls; subjecting the slurry to rotation at 500 rpm for 5 hours; converting the resulting nanoparticle suspension to a powder using anhydrous ethanol with sequential washing/drying at ambient temperature.

3 Claims, 5 Drawing Sheets

(52) U.S. Cl.
CPC ...... *C01P 2002/82* (2013.01); *C01P 2004/64* (2013.01); *C01P 2006/40* (2013.01)

(56) References Cited

OTHER PUBLICATIONS

Atkuri, H., et al., Preparation of ferroelectric nanoparticles for their use in liquid crystalline colloids, J. Opt. A: Pure Appl. Opt., 11, 2009.

Basun, S.A., et al., Dipole moment and spontaneous polarization of ferroelectric nanoparticles in a nonpolar fluid suspension, Physical Review B 84, 2011.

Evans, D.R. et al., Electric field interactions and aggregation dynamics of ferroelectric nanoparticles in isotropic fluid suspensions, Physical Review B, 84, 2011.

Idehenre, I.U., et al., Spectroscopic studies of the effects of mechanochemical synthesis on BaTiO3 nanocolloids prepared using high-energy ball-milling, Journal of Applied Physics, 124, 2018.

Barnakov, Y. A., et al., Uncovering the mystery of ferroelectricity in zero dimensional nanoparticles, Nanoscale Advances, 2019, 1, 664.

Cook, G., et al., Harvesting single ferroelectric domain stressed nanoparticles for optical and ferroic applications, Journal of Applied Physics 108, 2010.

Cook, G., et al., Assymetric Freedericksz transitions from symmetric liquid crystal cells doped with harvested ferroelectric nanoparticles, Optics express 17339, 2010, vol. 18, No. 16.

Atkuri, H.M., et al., Fabrication of Paraelectric Nanocolloidal Liquid Crystals, Mol. Cryst. Liq. Cryst., vol. 508, 2009.

Wang, X., et al., A General Strategy for nanocrystal synthesis, Nature, vol. 437, 2005.

Beh, E.S., et al., Molecular catalysis at polarized interfaces created by ferroelectric BaTiO3, Chem Sci. 2017, 8, 2790.

Cook, G., et al., Nanoparticle Doped Organic-Inorganic Hybrid Photorefractives, Optics Express 4015, 2008.

Morozovska, A.N., et al., Phase Transitions induced by confinement of ferroic nanoparticles, Physical Review B 76, 2007.

Wang, Y.G., et al., Phenomenological study of the size effect on phase transitions in ferroic particles, Physical Review B, vol. 50, No. 2.

Polking, M.J., et al., ferroelectric order in individual nanometre-scale crystals, Nature Materials, vol. 11, 2011.

* cited by examiner

FERROELECTRIC PARTICLES CONTROLLED BY FUNCTIONAL COATINGS

Pursuant to 37 C.F.R. § 1.78(a)(4), this application claims the benefit of and priority to prior filed Provisional Application Ser. No. 62/681,695, filed 7 Jun. 2018, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to nanoparticles and, more particularly, to ferroelectric nanoparticles controlled by functional coatings

BACKGROUND OF THE INVENTION

It has been well-documented that the spontaneous polarization/dipole moment dramatically reduces in magnitude as the particle/grain size of conventional ferroelectrics becomes less than 100 nm. Ferroelectricity was discovered in $BaTiO_3$ nanocolloids prepared by wet ball-milling in nonpolar heptane with oleic acid as a surfactant. Although the physics of these nanoparticles has not been well understood, they have been widely used in liquid crystal studies over the past couple of decades showing remarkable enhancements of both electro- and electro-optical responses. Moreover, ball-milled ferroelectric nanoparticles have been used outside of optical/liquid crystal applications for molecular catalysis applications, where the large dipole field from the ferroelectric nanoparticles replaces the need for any external bias. Until this time, ball-milling was mainly considered as a simple top-down approach for fabricating randomly-shaped ferroelectric nanoparticles, without a formal explanation for the existence of ferroelectricity on such a small scale. Since any observed ferroelectricity was extremely weak at best in chemically-produced nanoparticles, as opposed to the strong response detected in ball-milled nanoparticles, e.g. $BaTiO_3$, it was theorized that surface stress was mechanically-induced during the high energy ball-milling process, but the exact mechanism of the creation of the stress that provided such a large spontaneous polarization was unknown. It was also believed that the oleic acid, a typical choice of surfactants, served solely as a means of preventing particle aggregation. Accordingly, what is needed is an improved method of making ferroelectric $BaTiO_3$ nonparticles.

SUMMARY OF THE INVENTION

The present invention overcomes the foregoing problems and other shortcomings, drawbacks, and challenges of making ferroelectric $BaTiO_3$ nanoparticles having a very high spontaneous polarization values, i.e. >130 $\mu C/cm^2$. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a method for synthesizing ferroelectric nanoparticles comprises introducing solutions of $Ba(NO_3)_2$ (1 mmol) in 5 ml of deionized water, NaOH (12.5 mmol) in 5 ml of deionized water, Ti(IV) n-butoxide (1 mmol) in 5 ml of 1-butanol, 2.5 ml of oleic acid, and 5 ml of 1-butanol into a Teflon-lined autoclave vessel; heating the vessel to 135° C. for 18 h, resulting in barium titanate nanoparticles; and ball-milling the barium titanate nanoparticles in a solution of oleic acid and heptane to create a colloidal suspension of nanoparticles.

According to a first variation of the embodiment, the weight ratio of barium titanate:oleic acid:heptane may be about 1:1:20.

According to a further variation of the embodiment, the ball-milling step may further comprise introducing a slurry comprising 0.1 g of synthesized $BaTiO_3$ nanocubes, 0.1 g of oleic acid, and 15 mL of heptane into a ball-mill crucible filled with 2 mm $ZrO_2$ balls; subjecting the slurry to rotation at 500 rpm for 5 hours; and converting the resulting nanoparticle suspension to a powder using anhydrous ethanol with sequential washing/drying at ambient temperature. The various steps disclosed in the variations may be combined.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
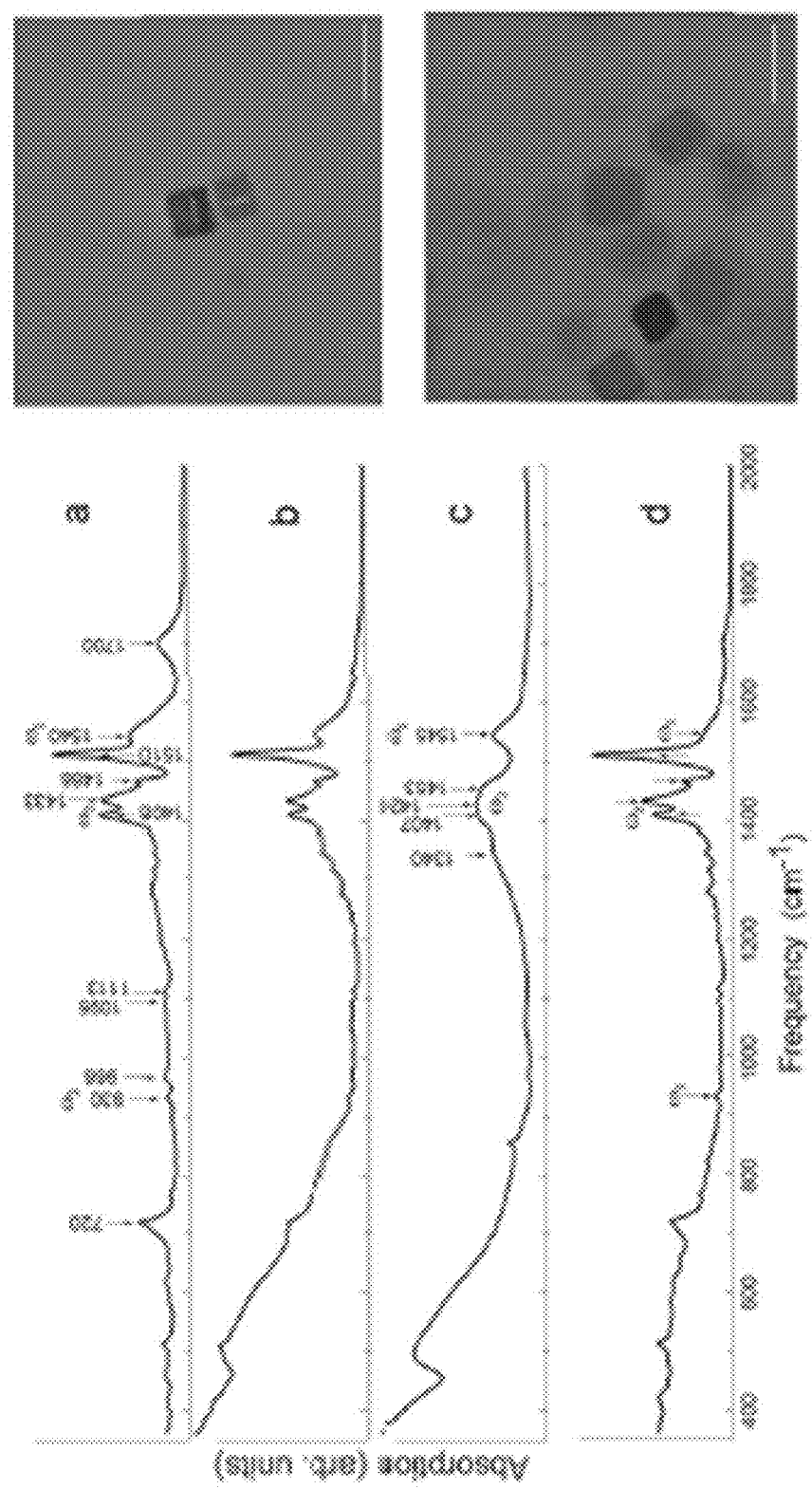
FIG. 1 depicts (Left) FTIR absorption spectra of (a) barium oleate, (b) ball-milled $BaTiO_3$ (Aldrich) nanoparticles, (c) $BaTiO_3$ nanocubes (pre-milled)-, and (d) post-milled $BaTiO_3$ nanocubes. $\omega_1$ corresponds to the asymmetrical stretching modes and $\omega_2$ corresponds to the symmetrical stretching modes. $\omega_3$ corresponds to the deformation mode of $COO^-$. (Right) TEM images of synthesized $BaTiO_3$ nanoparticles: pre-milled (top) and post-milled (bottom). The white bar depicts a 20 nm scale.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

One of the aspects of recent progress in preparative nanochemistry is the successful coating of nanoparticles' surface with surfactant molecules or organic ligands. While the main body of studies are devoted to the development and understanding of surface passivation chemistry, few have investigated the interrelation between nanoparticle core properties and specific surface ligands interaction. Although these molecular entities play a role of an inert passivating agent by neutralizing the surface reactivity of dangling bonds and preventing nanoparticles' agglomeration, their contribution to the nanoparticles' functionality has been largely unexplored.

It is this less explored area of surface physics/chemistry, in particular the influence it has on ferroelectricity on the nanoscale, which is our focus. We have experimentally discovered a correlation between the spontaneous polarization of ~10 nm (i.e. about 9-11 nm) hybrid $BaTiO_3$ nanoparticles/nanocubes and the molecular structure of a functional oleate coating, where an increase of the oleic acid concentration in the original slurry yields a colloidal suspension with a very large increase of the spontaneous polarization. However, a recent discovery shows that ball-milling also results in a chemical reaction at the nanoparticle surface, i.e. a mechanochemical formation of large quantities of barium oleate (up to 60% by weight). Depending on the ratio of oleic acid to $BaTiO_3$ in the slurry, spontaneous polarization values were measured from near zero (for a ratio of less than 1:1) to a record high value of >130 $\mu C/cm^2$ (for a ratio of greater than 1:1). The correlation between the spontaneous polarization and structural characteristics of samples was evaluated. We believe that a certain type of carboxylate coordination, in particular the chelating bidentate mode, and their molecular packing order are favorable to a spontaneous polarization enhancement due to an epitaxial strain mechanism (analogous to the epitaxial strain in 2-D thin films).

The metal carboxylate bulk compound is in a crystalline phase and plays an important role in maintaining/enhancing ferroelectricity in ball-milled nanoparticles. A relationship is established between spontaneous polarization of mechanochemically synthesized nanoparticles and their surface interactions with surrounding molecular entities. Newly-acquired evidence demonstrates that a particular type of binding mode (chelating bidentate mode) of carboxylates chemisorbed at the nanoparticles' surface and their molecular packing order/crystalline structure are responsible for a surface stress and dramatic enhancements of ferroelectricity (spontaneous polarization). It was discovered that there are physical differences among the carboxylate functional groups and the types of coordination binding modes for both chemically-(traditional wet chemistry approaches) and mechanically-(ball-milling) produced nanocolloidal suspensions; the mechanochemical synthesis produces superior ferroelectric nanoparticles/nanocolloidal suspensions.

A new technique/process is presented that overcomes the major drawback of ball-milled nanoparticles, i.e. their random shape and size distribution. This new technique results in uniformly-shaped, monodispersed, highly ferroelectric nanoparticles (i.e. >130 $\mu C/cm^2$), whose properties are defined by the type of coordination binding mode of $COO^-$ carboxylate of barium oleate. The difference in the binding modes is what allows for the typical amorphous (quasi-bridging bidentate structure) organic coating to become a crystalline (chelate bidentate structure) "shell" as a result of mechanochemical synthesis. Finally, the physical mechanism enabling a surface stress and thus a ferroelectric enhancement has been determined.

The surface stress, which is shown in this work to be an epitaxial-like stress/strain between the inorganic core and the surrounding crystalline organic component, is responsible for a 650 times enhancement of the spontaneous polarization (>130 $\mu C/cm^2$) in $BaTiO_3$ nanoparticles compared to non-stressed $BaTiO_3$ nanoparticles; this is a 5 times increase compared to the 26 $\mu C/cm^2$ found in bulk $BaTiO_3$. The fundamental understanding of the surface physics and the ability to manipulate it opens many doors for producing surface relevant properties for various applications, e.g. surface catalysis, liquid crystal displays, photorefractive beam coupling in hybrid devices, etc. This discovery paves the road toward the creation and control of ferroelectricity in uniformly-shaped "zero dimensional" ferroelectric "superparticles". The term "superparticles" refers to this new class of nanoparticles where the spontaneous polarization belongs to the inorganic/organic (core particle and functional shell) system and not just the inorganic nanoparticle itself.

It is widely accepted that ferroelectric materials undergo a degradation of their hallmark properties with size reduction, and even a complete disappearance at a critical size. This size dependence is manifested in the damping of the Curie temperature, the diffusive character of the phase transition, and the suppression of the spontaneous polarization. Therefore, the current challenge in nanoscale ferroelectrics is to enhance and stabilize ferroelectricity, while reducing the materials' dimensionality. Depending on the dimensionality of the nanomaterial, either 2-D thin films or 0-D nanoparticles, different strategies and mechanisms of ferroelectricity enhancement may be employed. Thin 2-D film technologies have demonstrated a steady and tangible success with well-developed fabrication procedures and a deep understanding of the materials' physics. As such, an elastic strain engineering concept based on a lattice mismatch was employed, achieving a 230% (60 $\mu C/cm^2$) enhancement of the spontaneous polarization (compared to bulk $BaTiO_3$, 26 $\mu C/cm^2$) in epitaxially grown $BaTiO_3$ multilayered thin films. This is supported by theory which shows a linear dependence of the spontaneous polarization as a function of elastic strain.

A different scenario is disclosed herein for 0-D nanoparticles synthesized via conventional wet chemistry routes. The relaxing synthetic conditions set modalities for the growth of nanoparticles with paraelectric centrosymmetric structures, where the properties are mainly determined by the inorganic core of the nanoparticle with minimal or no functionality from a coating/shell. Numerous experimental works fall into this paradigm supported by the size dependent phenomenological Landau-Devonshire Ginzburg (LDG) theory. The value of spontaneous polarization of well-defined single domain $BaTiO_3$ nanocubes and nanospheres was 0.2 $\mu C/cm^2$ (about 1% the value for the bulk crystal); the fact that these nanoparticles existed in the ferroelectric phase was an improvement to those that had been confined to the paraelectric phase.

Contrary to the well-understood theory of ferroelectricity, which shows that nanoparticles lose their large spontaneous polarization as particles become smaller, ball-milled ferroelectric nanoparticles have been shown to have an enhanced ferroelectric response at remarkably small sizes ($\leq$10 nm). Ball-milling not only results in fragmented materials on the nanoscale, it also is responsible for a mechanochemical synthesis of metal carboxylate formation at the nanoparticles' surface. The presence of such a compound, with a particular type of binding mode chemisorbed at the nanoparticles' surface and a crystalline molecular packing order, is responsible for the stress.

This inorganic-organic hybrid core-shell structure exhibits a similar epitaxial strain as observed in thin films, resulting in a dramatic enhancement of ferroelectricity (spontaneous polarization), which is at least 5 times greater than that of the bulk material.

$BaTiO_3$ ferroelectric nanoparticles have provided benefits to numerous liquid crystal applications, even though the chemistry of these nanocolloids was not fully understood. Our review of infrared absorption spectra reveals that ferroelectric $BaTiO_3$ nanocolloids are more than just $BaTiO_3$ nanoparticles in oleic acid and heptane as previously believed. We discovered that ball-milling plays a bigger role than just a top-down approach for creating nanoparticles. Instead, it was discovered that the mechanochemical synthesis is responsible for converting a large amount of the oleic acid to barium oleate bulk compound. Accordingly, we found that one cannot treat the oleic acid as a mere surfactant when considering new methods/recipes to improve fabrication processes for creating highly ferroelectric nanoparticles for optical applications.

Ball-milled $BaTiO_3$ nanoparticles may be created from a slurry of $BaTiO_3$ powder in non-polar heptane with oleic acid, where it was believed (prior to this work) that the oleic acid acts as a surfactant to combat unwanted agglomeration.

It is known that oleic acid concentration is important as a factor of the suspension stability. On the other hand, the presence of oleic acid molecules in liquid crystals hosts may be detrimental, i.e. it can reduce the molecular ordering as seen by a reduction in the nematic to isotropic temperature changes. Thus the inclusion of oleic acid must be weighed against any deleterious effects it may have in various applications.

Prior research to quantify the impact of oleic acid on the liquid crystal host was conducted using Fourier transform infrared spectroscopy (FTIR) and differential scanning calorimetry (DSC) to determine the interaction of the oleic acid as a function of concentration (oleic acid-oleic acid and oleic acid-nanoparticle interactions). The results revealed the disappearance of an absorption band at 1710 $cm^{-1}$ (a defining feature of the carboxylic acid's (C=O) carboxyl group), and the emergence of another absorption band around 1550 $cm^{-1}$. The new absorption band was (erroneously) attributed to the binding of the surfactant molecules to the surface of the nanoparticles; the exact nature of the observed change was not explored in detail.

Our efforts have revealed that the transformation observed in the IR spectra is an indication of a chemical transformation of the oleic acid molecules. It is important to emphasize that the prior art's simplified consideration of ball-milling as just the creation of nano-sized materials through defragmentation serves only to deemphasize and overshadow other possible phenomena and events occurring during the process which we believe lead to misinterpretations and wrong conclusions. Instead, the mechanical energy of colliding beads may facilitate chemical reactions (mechanochemical synthesis) resulting in products that would otherwise be difficult to obtain. While the impact of free oleic acid on the nematic phase of liquid crystals is important, it may be just as important to examine what affect other chemical byproducts of ball-milling (i.e. metal carboxylates) have on the system.

Furthermore, one must also consider these chemical changes when determining the amount of oleic acid needed in the starting material as a function of particle size (i.e. grind time), and how the ratio of oleic acid to metal carboxylate (post milling) affects liquid crystal parameters/performance. To date, such studies have not considered the large chemical conversation that the oleic acid molecules undergo during ball-milling.

We have discovered experimental evidence of the mechanochemical synthesis of a metal carboxylate (barium oleate bulk compound) during high energy ball-milling of $BaTiO_3$ in heptane with oleic acid. The obtained compound shows similar FTIR features to ball-milled (commercial) barium oleate, with the carboxylate group in predominantly a bidentate chelate coordination binding mode, and has no noticeable overlap with unmilled oleic acid. The formation of this byproduct of ball-milling may also influence the ferroelectric properties of $BaTiO_3$ ferroelectric nanocolloids. However, it was discovered that the ferroelectric properties were maximized only when the barium titanate nanocrystals were produced from solution. That is, when barium titanate nanocrystals of the appropriate size, i.e. 9-11 nm, were produced by ball-milling, they exhibited significantly lower ferroelectric behavior than those nanocrystals made by a soft solution approach and subsequently subjected to ball-milling in oleic acid and heptane.

Soft solution preparation of $BaTiO_3$ nanocubes

Thermal decomposition of metal fatty salts under hydrothermal conditions at temperatures as low as 135° C.

Solutions were prepared under an inert atmosphere, e.g. Ar, N, etc. . . .

$BaTiO_3$ nanocubes (pre-milled) were synthesized using a solvothermal synthesis. $BaTiO_3$ nanocubes were prepared, for example, in a Teflon-lined autoclave vessel (Parr Instruments) loaded with solutions of $Ba(NO_3)_2$ (I mmol) in 5 ml of deionized water, NaOH (12.5 mmol) in 5 ml of deionized water, Ti(IV) n-butoxide (I mmol) in 5 ml of 1-butanol, 2.5 ml of oleic acid, and 5 ml of 1-butanol, and heated to 135° C. for 18 h. The resulting $BaTiO_3$ nanocubes were then ball-milled using a planetary high energy ball-mill Retsch PM 100. For this latter case, a slurry comprising 0.1 g of synthesized $BaTiO_3$ nanocubes, 0.1 g of oleic acid and 15 mL of heptane was immersed into a ball-mill crucible filled with 2 mm $ZrO_2$ balls and subjected to rotation at 500 rpm for 5 hours; the produced suspension was converted to powder using anhydrous ethanol with sequential washing/drying at ambient temperature, resulting in a white precipitation. Note: the use of the term 'nanocubes' refers to nanoparticles with a controlled cubic shape achieved using solvothermal synthesis techniques.

Optical, electrical, and morphological studies were performed on the above-mentioned nanomaterials. Temperature dependent infrared absorption spectra were measured using Fourier-transform infrared spectroscopy with an FTIR-NIR Bruker spectrophotometer in Attenuated Total Reflection (ATR) configuration over the range of 400-3000 cm$^{-1}$ with 2 cm$^{-1}$ resolution. AC displacement current density measurements provided values of the spontaneous polarization of samples that were preliminarily diluted (1:1000) with heptane containing 0.4% by weight of oleic acid. Surface morphology was investigated using a Philips CM 200 transmission electron microscope with 200 kV accelerating voltage. In addition, X-ray diffraction (XRD) measurements were conducted on dried out solutions of the ball-milled sample in heptane with oleic acid (weight ratio of oleic acid:BaTiO$_3$ is 1:1) and without oleic acid, as well as commercial barium oleate and commercial BaTiO$_3$ starting powders; thermogravimetric analysis (TGA) measurements were conducted to investigate the organic phase of the nanocolloids.

The prior art assumed that a surface stress in the nanoparticles was responsible for the ferroelectric enhancement; the present disclosure shows the first empirical evidence to this support argument and provides a detailed explanation for the source of the stress. To explore this effect, several samples were studied, which included ball-milled BaTiO$_3$ nanoparticle suspensions made from commercial Aldrich powder, solvothermally synthesized nanocubes and their ball-milled counterpart, and the individual components of ball-milled commercial barium oleate (Pfaltz & Bower) and unmilled commercial BaTiO$_3$ (Aldrich) powder. For brevity, the samples will be referred to throughout the text as: "ball-milled nanoparticles" (using commercial starting materials, Aldrich powder), "pre-milled nanocubes" (produced by solvothermal synthesis), and "post-milled nanocubes" (solvothermally synthesized nanocubes subjected to post-growth high-energy ball-milling as a means of mechanochemical synthesis).

The identification of both the local structure of barium oleate and the long-range molecular ordering can be achieved using FTIR spectroscopy. FIG. 1 shows the FTIR absorption spectra for: (a) ball-milled commercial barium oleate, (b) ball-milled BaTiO$_3$ nanoparticles, (c) pre-milled BaTiO$_3$ nanocubes, and (d) post-milled BaTiO$_3$ nanocubes. Note, the average nanoparticle size reduces as the milling time increases, asymptotically reaching a minimum average size of approximately 9-10 nm. For this reason ball-milling of the solvothermal synthesized ~10 nm nanocubes was not expected to reduce the size any further, although it was expected that it could affect the chemical properties of the organic component (coating/shell) and the level of surface stress. TEM images of synthesized BaTiO$_3$ nanocubes are shown in FIG. 1 for both the premilled (c) and the post-milled (d) material. There is no significant change in the average sizes or shape of the pre- and post-milled nanocubes; this is a dramatic improvement over the (prior art) top-down approach of ball-milling bulk material, which did not allow for any control of the shape of the nanoparticle.

In FIG. 1, the FTIR absorption spectra of (a), (b), and (d) are nearly identical with only minor differences, such as the feature centered around 1710 cm$^{-1}$ and the low-frequency tail. The 1710 cm$^{-1}$ peak is a "fingerprint" of the vibrational mode of carbonyl (C=O), which is associated with the presence of free oleic acid molecules found in commercial barium oleate, and the broadband low-frequency tail is due to the BaTiO$_3$ absorption. The spectrum of the pre-milled BaTiO$_3$ nanocubes (FIG. 1(c)) is distinctly different from the others suggesting a different type of COO$^-$ coordination mode. It is known, for different types of carboxylates, that the splitting in energy between asymmetrical and symmetrical stretching vibrations ($\omega_{asym}-\omega_{sym}=\Delta$) of a given carboxylate is indicative of the type of carboxylate coordination binding mode. Based on this criteria, the four major carboxylate structures can be characterized as follows (see FIG. 2): (I) $\Delta$>110 cm$^{-1}$–a bridging bidentate, in which each oxygen of the carboxylate covalently bonds to a different metal cation, (II) $\Delta$<110 cm$^{-1}$–a chelating bidentate, in which charge of the carboxylate is shared across the oxygen atoms, which both form covalent bonds with the metal cation, (III) $\Delta$>200 cm$^{-1}$–a covalent monodentate, in which a negatively charged oxygen of the carboxylate forms a covalent bond with the metal ion, and (IV) an ionic monodentate, in which one negatively charged oxygen of the carboxylate and a metal cation form an ionic bond.

Figure 2:
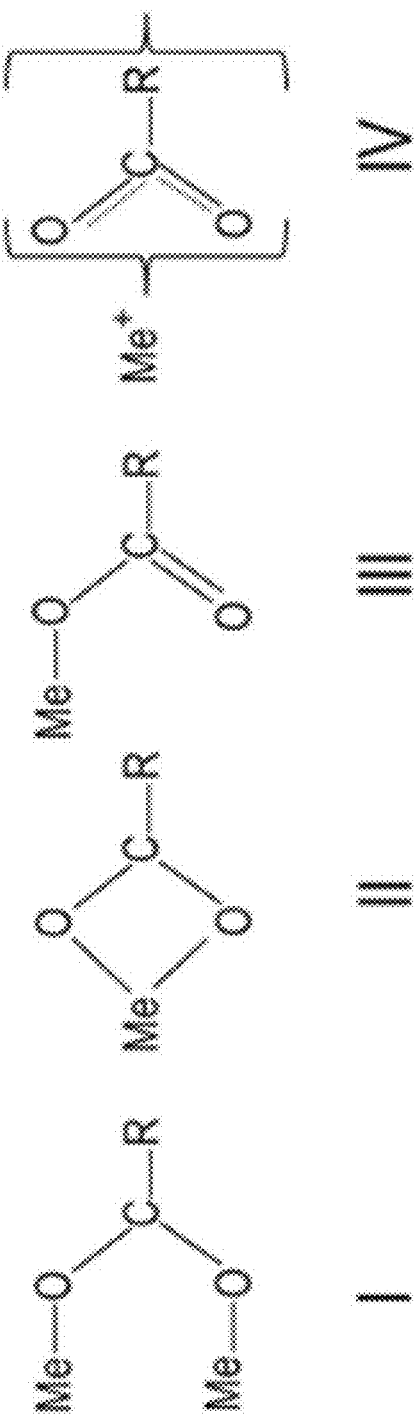
FIG. 2 depicts types of carboxylate coordination modes: (I) bridging bidentate, (II) chelate bidentate, (III) covalent monodentate, and (IV) ionic monodentate, where R is $C_{17}H_{33}$.

Typically, the characteristic IR absorption bands for metal carboxylates, in particularly the carboxylate group (COO$^-$) are in the range 1500-1610 cm$^{-1}$ for asymmetrical stretching modes ($\omega_1$ in FIG. 1) and 1300-1450 cm$^{-1}$ for symmetrical stretching modes ($\omega_2$ in FIG. 1). For the samples shown in FIGS. 1(a), (b), and (d), the sharp peak at 1510 cm$^{-1}$ and the shoulder around 1540 cm$^{-1}$ are related to asymmetrical stretching modes, while the 1408 cm$^{-1}$ band is related to the symmetrical stretching modes. The 1466 cm$^{-1}$ band is assigned as CH$_2$ bend ($\delta$ (CH$_2$) scissoring band), however, an assignment of 1433 cm$^{-1}$ is not straightforward. It may be related to symmetrical stretching such that there are two pairs of $\omega_{asym}$ and $\omega_{sym}$ frequencies ($\omega_{asym}$=1510 cm$^{-1}$, $\omega_{sym}$=1408 cm$^{-1}$ and $\omega_{asym}$=1540 cm$^{-1}$, $\omega_{sym}$=1433 cm$^{-1}$) with a value of $\Delta$ for both cases being <110 cm$^{-1}$, justifying the chelate structure (FIG. 2, Type II). On the other hand, the 1433 cm$^{-1}$ feature may be related to CH$_2$ vibrations resulting from the overlap of $\omega_1$ (COO$^-$) stretching and $\delta$ (CH$_2$) scissoring bands. In this case, a mixture of both chelate and quasi-bridging ($\Delta$ value for the pair 1540 cm$^{-1}$ and 1408 cm$^{-1}$ is 132 cm$^{-1}$) coordination modes would need to be considered. Nevertheless, the presence of chelates is dominating in these samples (for example, see the 1510 cm$^{-1}$ strong absorption in the cases of FIGS. 1(a), (b), and (d)); this type of local structure favors an ordered arrangement of barium oleate molecules at the nanoparticle surface. Equally spaced absorption peaks in the range 1180-1350 cm$^{-1}$ (progressive bands—attributed to wagging/twisting vibrations of chains of successive methylene groups of the barium oleate molecule) and the 720 cm$^{-1}$ feature (attributed to rocking vibrations of chains of successive methylene groups of the barium oleate molecule) both serve as proof of crystallization of barium oleate.

Figure 3:
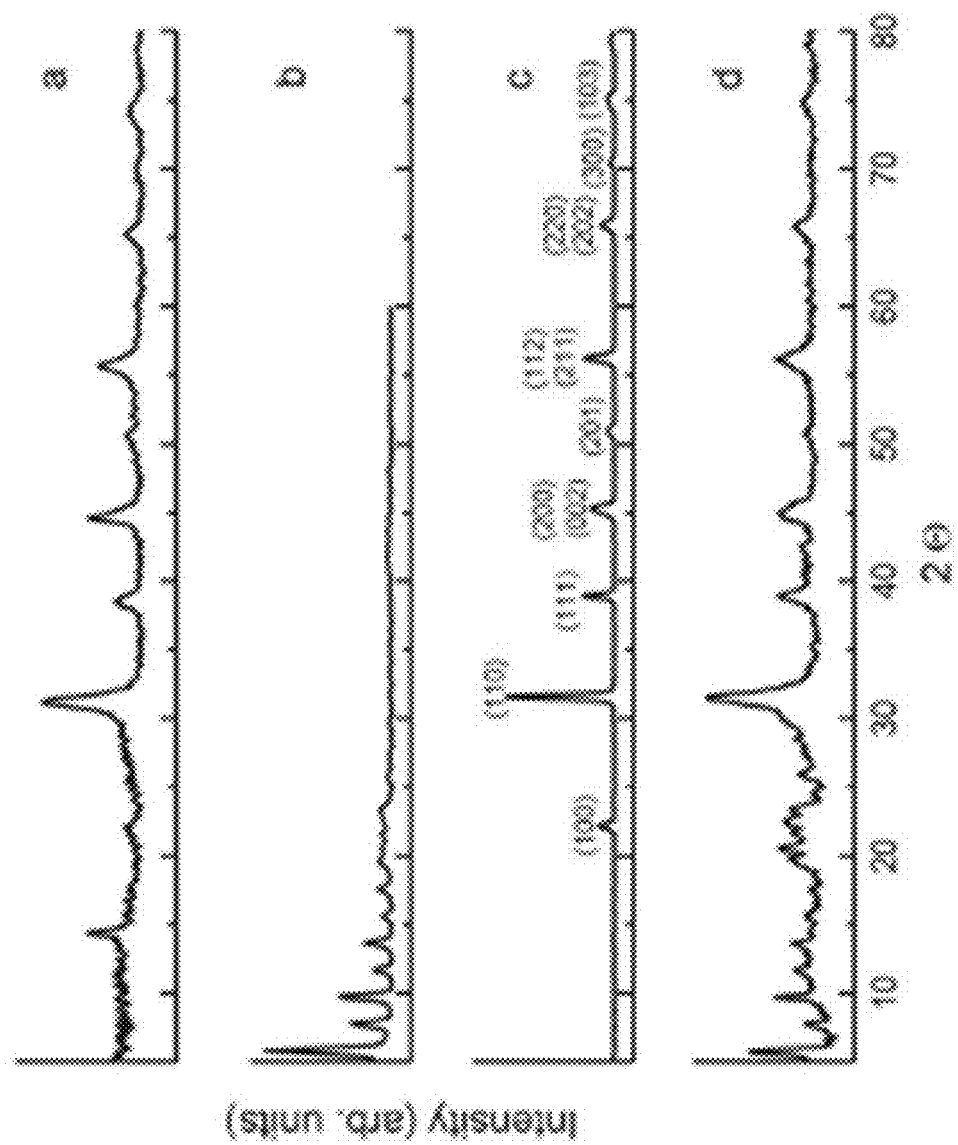
FIG. 3 depicts XRD patterns of: (a) 25 hr. ball-milled $BaTiO_3$ without oleic acid in heptane, (b) ball-milled commercial barium oleate, (c) commercial $BaTiO_3$ (Aldrich, 130 nm) powder/starting material, and (d) 25 hr. ball-milled $BaTiO_3$ with oleic acid in heptane.

Further evidence of the crystalline structure of the chelate bidentate in the ball-milled samples is shown in the diffraction patterns of the XRD data found in FIG. 3. The ball-milled sample with oleic acid presented in FIG. 3(d) is comprised of two phases: organic barium oleate (i.e. mechanochemical synthesis converts both oleic acid and quasi-bridging configured metal carboxylates to the chelate configured metal carboxylates) characterized by the equally spaced sharp reflection peaks below 20° of $\theta$, and inorganic BaTiO$_3$ nanoparticles characterized by broad reflection peaks above 20° of $\theta$ (individual components shown in FIG. 3(b), (c), respectively). Thermogravimetric analysis (TGA) measurements confirmed the presence of an organic phase in the sample and estimated its quantity as much as 50% by weight. It is worth noting that the sharp reflection peaks below 20° of θ in FIG. 3(b), (d) demonstrate the crystalline nature of the organic component found in pure (ball-milled) barium oleate and ball-milled BaTiO$_3$ (with oleic acid), respectively. For the case of the ball-milled BaTiO$_3$ without oleic acid in heptane, FIG. 3(a), no reflection peaks are observed below 20° of θ.

In contrast to the discussion above, the FTIR absorption spectrum of the pre-milled nanocubes in FIG. 1 (top right image) shows broad asymmetrical stretching (centered at 1545 cm$^{-1}$ with no sign of the 1510 cm$^{-1}$ absorption band) and broad symmetrical stretching (centered at 1426 cm$^{-1}$ including the 1408 cm$^{-1}$ band) carboxylate modes with an energy splitting (Δ) of either 119 cm$^{-1}$ or 137 cm$^{-1}$; in both cases the Δ-values correspond to quasi-bridging bidentate binding mode (FIG. 2, Type I). This type of local structure favors a random (amorphous) distribution of barium oleate molecules at the nanoparticle (nanocube) surface. The complete assignment of IR absorption lines of the samples is in Table 1.

TABLE 1

Spectroscopic assignments of FTIR absorption bands of ball-milled BaTiO$_3$/barium oleate nanoparticles/nanocubes.

| Frequency, cm$^{-1}$ | Intensity | Assignment |
| --- | --- | --- |
| 495 | weak | Ba—O, (TiO$_3$) |
| 720 | weak | CH$_2$ rocking |
| 930 | weak | ω$_3$ COO$^-$ deformation |
| 1059 | weak | C—C stretching |
| 1095 | weak | |
| 1113 | weak | CH$_3$ rocking |
| 1240 | weak | |
| 1279 | weak | CH$_2$ twisting, wagging |
| 1320 | weak | |
| 1344 | weak | |
| 1408 | strong | ω$_1$ COO$^-$ symmetrical stretching |
| 1433 | strong | |
| 1466 | medium | CH$_2$ bend {δ (CH$_2$) scissoring} |
| 1510 | strong | ω$_1$ COO$^-$ asymmetrical stretching |
| 1540-1545 | strong | |
| 2852 | strong | CH$_2$ symmetrical stretching |
| 2922 | strong | CH$_2$ asymmetrical stretching |

Figure 4:
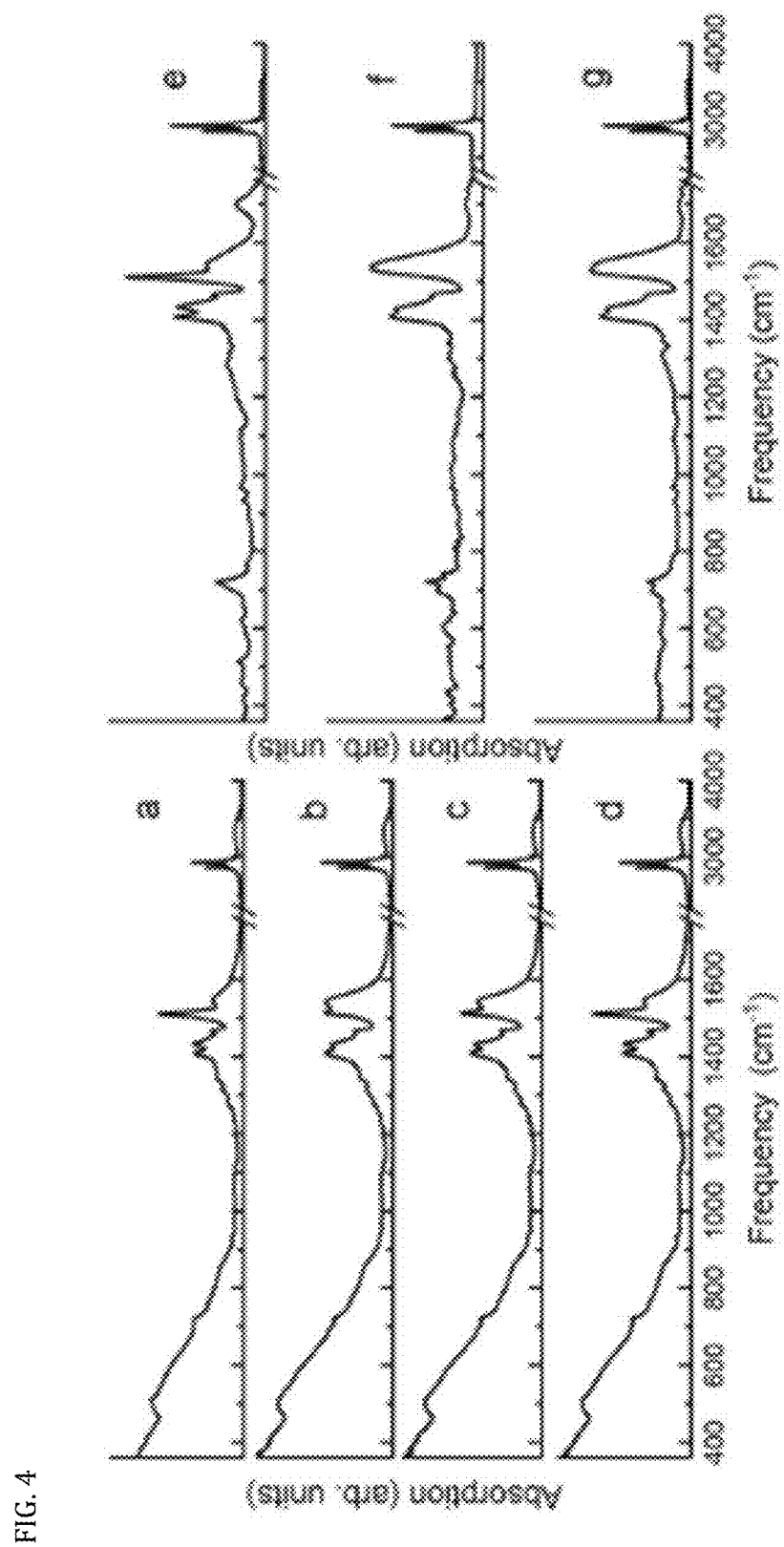
FIG. 4 depicts (Left) FTIR spectra of ball-milled $BaTiO_3$ nanoparticles at room temperature: (a) before annealing, and (b-d) after annealing at 140° C. and cooling back to room temperature. The time between cooling to room temperature and the subsequent measurements varied: (b) 10 min, (c) 60 min, and (d) 300 min. (Right) FTIR spectra of commercial barium oleate at room temperature: (e) before annealing, and (f, g) after annealing at 140° C. and cooling back to room temperature. The time between cooling to room temperature and the subsequent measurements varied: (f) 10 min. and (g) 300 min. The spectra in FIGS. 2b and 2f were measured 10 min. after cooling the sample to room temperature to assure for a uniform temperature profile throughout the sample.
Figure 5:
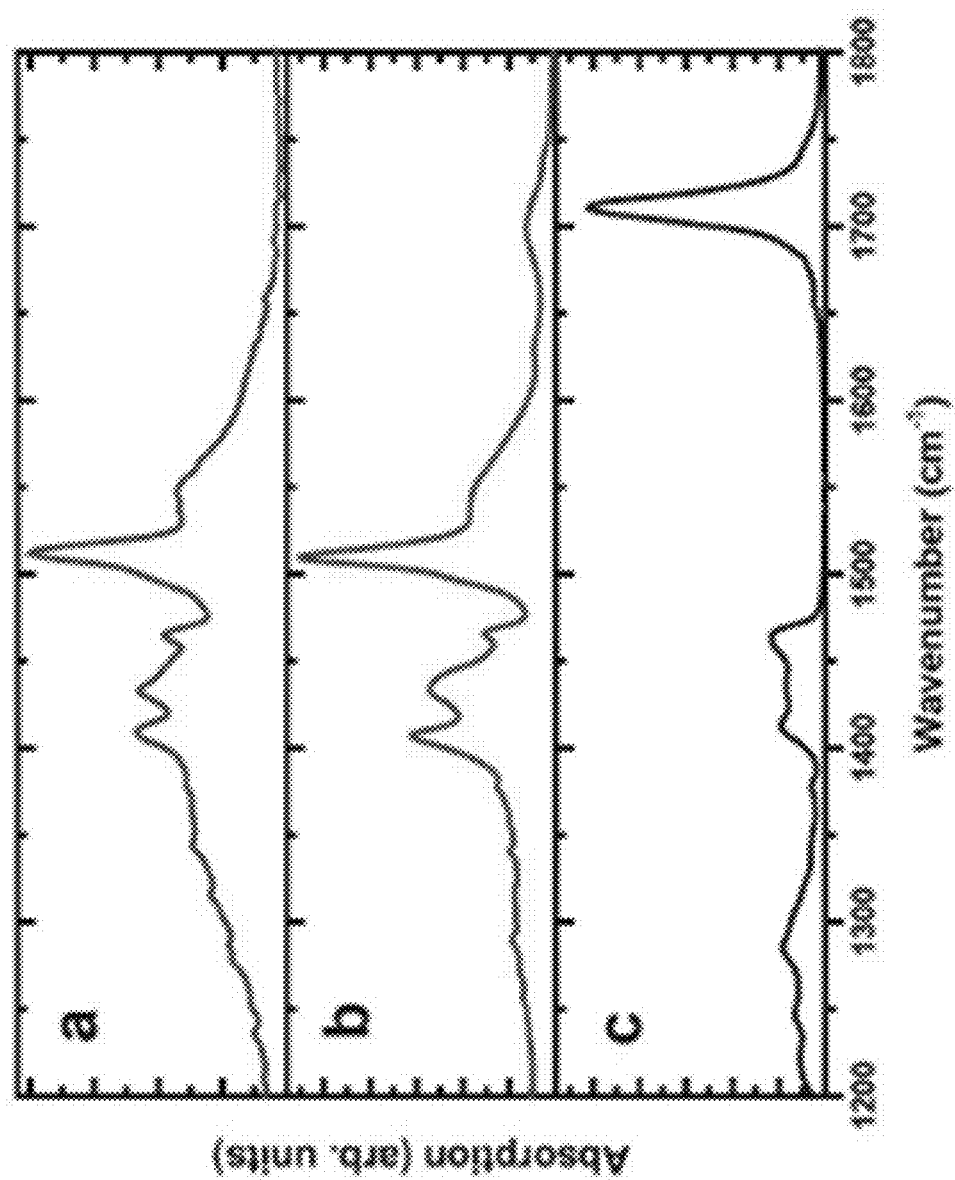
FIG. 5 depicts absorption spectra of: a) ball-milled $BaTiO_3$ nanocolloidal suspension, b) ball-milled commercial barium oleate, and c) commercial (un-milled) oleic acid.

Similar in nature to the transformation of the quasi-bridging to chelate coordination binding modes resulting from milling (i.e. mechanochemical synthesis), a transformation of chelate to quasi-bridging coordination binding modes was observed by annealing the milled BaTiO$_3$ nanoparticles (milled Aldrich powder from FIG. 1(b)) at 140° C., which is above the Curie temperature. FIG. 4(a)-(d) shows the FTIR absorption spectra of the ball-milled nanoparticles before annealing, and as a function of time at room temperature after cooling. It can be seen that annealing the sample drastically modifies the absorption spectrum, as shown in FIG. 4(b). (Note, the spectra in FIG. 4(b), (0 were measured 10 min. after cooling the sample to room temperature to assure for a uniform temperature profile throughout the sample). In particular, the intensity of the 1540 cm$^{-1}$ band increased at the expense of 1510 cm$^{-1}$ band, i.e. quasi-bridging bonds increased at the expense of chelate bonds, which was shown to be a reversible process in FIG. 4; the sample with a time delay on the order of hours (FIG. 4(d)) showed nearly a full recovery of the 1510 cm$^{-1}$ band (i.e. a reversal of the quasi-bridging bonds back to the chelate bond structure).

This reconfigurable "self-healing" mechanism was observed only for samples that initially had the chelate bond structure. Unlike the reversible-nature of the oleate-shell structure of the ball-milled nanoparticles, the annealing of commercial barium oleate resulted in a permanent transformation of the sample (to a quasi-bridging coordination) with a broadening of asymmetrical and symmetrical peaks, shown in the FIG. 4(e)-(g).

A key observation is the similarity between FIG. 1 (top right image) and FIG. 4(b), where the pre-milled nanocubes (with the Type I quasi-bridging bidentate shell) have an absorption spectrum strongly resembling that of the annealed ball-milled nanoparticles (measured within minutes after cooling to room temperature); in both cases the quasi-bridging coordination mode is dominant (note the lack of the 1510 cm$^{-1}$ absorption band). The balled-milled nanoparticles measured hours after cooling (FIG. 4(d)) and the nanocubes measured after ball-milling (FIG. 1(d)) show an interesting transformation between the quasi-bridging coordination mode (Type I) and the chelating coordination mode (Type II). The milling of the nanocubes introduced a surface stress, created by the oleate shell with a chelate coordination binding mode, which was annealed out of the sample (with a transformation to a quasi-bridging coordination binding mode, FIG. 4); over time (hours) the stress was reapplied as the oleate shell transformed back to the ordered chelate structure. This latter point is rather interesting, as it demonstrates that a reversible process occurs when the carboxylate "shell" undergoes a slow transformation back to its original chelate state (Type II), providing the epitaxial strain (mismatch between the shell and the core particle) that enhances the ferroelectric properties of the nano-system, i.e. the superparticle. The condition that would allow for such a strain is manifested in the crystalline nature of the Type II bonding structure and BaTiO$_3$ core particle. With the Type II bond structure, there can exist a lattice mismatch between the shell and the core, which cannot exist with the Type I bond structure as it is an amorphous shell. This is analogous to the lattice mismatch found in 2-D thin films. The difference between the ordered arrangement of Type II and the random distribution of Type I are quite evident when comparing the absorption spectra of FIG. 1(c), (d) (pre- and post-milled nanocubes); note the difference of the absorption bands that demonstrate the crystalline nature of the oleate (720 cm$^{-1}$ and 1180-1350 cm$^{-1}$). There is also a distinct difference when comparing the sample 10 min. after cooling down to room temperature (FIG. 4(b)) to either the pre-heated case (FIG. 4(a)) or the cooling case after 300 min. (FIG. 4(d)). The absorption bands assigned to the rocking vibrations and progressive bands (720 cm$^{-1}$ and 1180-1350 cm$^{-1}$) are less pronounced for the sample 10 min. after cooling down. Even after 10 minutes we started to see some signs of a transformation back to the Type II coordination mode. For the case of 300 min. after the thermal cycle, the absorption bands appear to be as strong as the pre-heated case.

In order to compare the ferroelectric properties of BaTiO$_3$ with either a Type I shell (quasibridging, random distribution) or a Type II shell (chelating, ordered arrangement), the pre- and post-milled nanocubes are ideal samples to use as their size and shape of the core BaTiO$_3$ particle are practically the same (see FIG. 1 TEM images); therefore, any difference in ferroelectricity would certainly result from the carboxylate coordination mode. The AC displacement current density measurements of synthesized BaTiO$_3$ nanocubes reveal a remarkable difference in magnitude of the spontaneous polarization for pre- and post-ball-milled nanocubes, $P_s$=0.2 and $P_s$=130 μC/cm$^2$, respectively. By way of comparison, the spontaneous polarization of milled synthesized nanocubes is 5 times greater than that of bulk BaTiO$_3$.

In summary, as stated above, we have developed a significant improvement in the spontaneous polarization in ~10 nm ball-milled $BaTiO_3$ nanocubes, which is linked to in-situ mechanochemically-produced barium oleate with a chelate bidentate coordination; this results in ferroelectric "hybrid" nanoparticles having an organic functional shell/coating surrounding an inorganic core. Because of the synergistic effect of the core and shell, we call this nanoparticle a 'superparticle', because the spontaneous polarization/dipole moment belongs to the system and not just the nanoparticle itself. The mystery of the source/mechanism providing the surface stress has now been identified as an epitaxial strain between the core and the functional shell of the superparticle. The chelate carboxylate (Type II shell) surrounding the core $BaTiO_3$ nanoparticle is the primary source of the "epitaxial" strain/stress generation due to its crystalline nature, which is responsible for a 5-fold enhancement of the spontaneous polarization with respect to $BaTiO_3$ bulk crystal, and a 650-fold enhancement of spontaneous polarization compared to synthesized (non-milled, Type I shell) $BaTiO_3$ nanocubes. Thus, ball-milled ~10 nm $BaTiO_3$ nanocubes (solvothermally synthesized) surrounded with such (Type II) ligands exhibit excellent ferroelectric properties.

While the relaxing conditions of chemical synthesis set modalities for growth of paraelectric $BaTiO_3$ nanoparticles with oleate molecules in bridging or quasi-bridging (random distribution) binding modes which is unattractive for the strain generation, the chelate (ordered arrangement) binding structure has been shown to be the source of dramatically enhanced ferroelectric performance. Furthermore, it has been demonstrated that only the particular combination of solvothermal and mechanochemical (via ball-milling) synthesis allows for the creation of crystalline structured functional surface bonds (unachievable by conventional chemistry) which provides the conditions for ferroelectricity. The combination also provides for the first time the means to make uniformly-shaped, monodispersed, highly ferroelectric nanoparticles. The ability to create monodispersed ferroelectric nanoparticles with both a large spontaneous polarization and uniform-shape may further advance numerous fields, for example, in liquid crystal applications they would provide a means for increasing the field sensitivity, while not introducing a plethora of defects from randomly shaped particles that modify liquid crystal parameters such as phase behavior, transition temperatures, and long-range ordering.

The invention is a functional coating, which in the case of (for example) $BaTiO_3$, comprises a metal carboxylate (i.e. barium oleate). The barium oleate bulk compound provides functional surface bonds that are unachievable by conventional chemistry. The process for creating metal carboxylates with the necessary bond structure is a mechanochemical synthesis (achieved via high energy balling-milling). Standard chemical synthesis routes do not provide the necessary bond structure. Creating a metal carboxylate with a chelating bidentate coordination mode opposed to the typical quasi-bridging bidentate mode makes the difference of ~650 times greater spontaneous polarization. This mechanochemical process alone can provide ferroelectric nanoparticles with a large spontaneous polarization, but with random shapes/sizes. Solvothermal synthesis of the $BaTiO_3$ nanocubes provides even stronger ferroelectric properties, with vast improvements in the uniformity of shape/size (with no significant changes in either parameter taking place during the mechanochemical processing).

Because of the limitations of fragmentation, balling-milling has an apparent minimum size limitation, ~9 nm for $BaTiO_3$. One of the techniques that we have developed is to first use solvothermal synthesis which produces nanoparticle of uniform shape and size (these two parameters are controllable and based on the synthesis parameters). These particles exhibit 100's of $\mu C/cm^2$, over 650 times less than what we achieve via other processes. By fabricating ~10 nm nanoparticles (e.g. about 9-11 nm) which are presumably mostly in the paraelectric phase, we can converted the surfactant (typically oleic acid) to a functional organic crystalline material that induces surface stress in the nanoparticle. We have shown that this process does not change the shape or size of what was controllably produced by the solvothermal synthesis method. This is not limited to solvothermal synthesis nor ball-milling; any method to achieve a uniform non-ferroelectric nanoparticle (i.e. wet chemistry methods), and any means to achieve mechanochemical synthesis converting the organic into a functional material should work as well. Note: while other surfactants have been shown to work, many have been shown not to work as they did not get converted into the functional coating/shell. Also, this is not limited to the use of carboxylates as the functional organic, any materials—organic or inorganic—can provide the same effect if it exist in a crystalline form (opposed to e.g. an amorphous form). The physical mechanism creating the conditions for a surface stress is the lattice mismatch between the nanoparticle core and the function shell. Surface stress has been previously suggested as being a means to allow ferroelectricity to exist (not necessarily in an enhanced state though), the problem was, no one knew how to physically create such a stress or control it until now. This can be used in both nanoparticle and nanocolloidal suspension forms.

The organics (e.g. surfactants and solvents), etc. may be interchanged, depending on the application and the inorganic core being used. Other examples of core materials are $LiNbO_3$, $KNbO_3$, $BaTiO_3$, $SrTiO_3$, $PbTiO_3$, $BiFeO_3$, $ZnO$, etc. The key is in the overall core shell 'system'; the core materials are not a limiting factor. The organics are only limiting in the sense that they must form a crystalline-like shell providing a lattice mismatch with the core particle. Size and shape may vary based on application. Random shapes and sizes are possible if one would desire it. Heptane was used because it does not interfere with electrical measurements, but THF, water, etc. can be used as well. Oleic acid is preferred as it does not degrade device performance in common applications, but others have been shown to work as well, i.e. Span80 (Sorbitan, mono-(9Z)-9-octadecenoate), and AOT (sodium 4-bis(2-ethylhexyl)oxy-1,4-dioxobutane-2-sulfonate.

Mechanochemical Synthesis $2BaTiO_3 + 6C_{18}H_{34}O_2 \rightarrow BaTiO_3 + Ba(C_{18}H_{33}O_2)_2 + Ti(C_{18}H_{33}O_2)_4 + 3H_2O$, where $Ba(C_{18}H_{33}O_2)_2$ is barium oleate and $Ti(C_{18}H_{33}O_2)_4$ titanium oleate. Note that no direct evidence of titanium oleate was observed. Based on this reaction formula it takes six (6) molecules of oleic acid to consume 1 (one) molecule of $BaTiO_3$. The IR spectrum of the unwashed $BaTiO_3$ sample indicates that most of the oleic acid was converted to oleate. We estimate that the mole fraction of $BaTiO_3$ in the final product is roughly 0.6 based on the mass of the reactants prior to ball-milling and the molar mass of oleic acid (282.46 g/mol) and $BaTiO_3$ (700.24 g/mol). In other words, 60% of the $BaTiO_3$ remains after the mechanochemical synthesis, with the other 40% converted to some form of metal carboxylate (oleate). X-ray diffraction (XRD) of the ball-milled particles readily shows the signature $BaTiO_3$ features indicating that an appreciable amount remains after milling.

CONCLUSION

FTIR spectroscopy of ball-milled $BaTiO_3$ in oleic acid and heptane solutions was explored, comparing the absorption spectra of all nanocolloidal suspension components, including those created from mechanochemical synthesis, i.e. barium oleate bulk compound.

It was found that the FTIR spectra are nearly identical, clearly indicating the mechanochemical synthesis of barium oleate during the milling process. This efficient conversion of a large amount of the oleic acid to a barium oleate bulk compound during the milling process implies that oleic acid is more than just a surfactant to prevent the agglomeration of nanoparticles as previously believed; it is the source of the metal carboxylate (barium oleate in the case of $BaTiO_3$). The identification of barium oleate as the key organic component, and not the starting material oleic acid, provides critical information that needs to be considered in all future studies to optimize the nanocolloidal suspension/particle sizes for use in liquid crystal and other applications (optical and non-optical).

Furthermore, knowing all of the organic components involved in the nanocolloid suspensions is of particular importance if the end goal is to minimize adverse effects, maximize beneficial effects, and optimize the processes/methodology in fabricating these materials.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for synthesizing ferroelectric nanoparticles comprises:
    introducing solutions of $Ba(NO_3)_2$ (1 mmol) in 5 ml of deionized water, NaOH (12.5 mmol) in 5 ml of deionized water, Ti(IV) n-butoxide (1 mmol) in 5 ml of 1-butanol, 2.5 ml of oleic acid, and 5 ml of 1-butanol into a Teflon-lined autoclave vessel;
    heating the vessel to 135° C. for 18 h, resulting in barium titanate nanoparticles; and
    ball-milling the barium titanate nanoparticles in a solution of oleic acid and heptane to create a colloidal suspension of nanoparticles.

2. The method for synthesizing ferroelectric nanoparticles of claim 1, wherein the weight ratio of barium titanate:oleic acid:heptane is 1:1:20.

3. The method for synthesizing ferroelectric nanoparticles of claim 1, wherein the ball-milling step further comprises
    introducing a slurry comprising 0.1 g of synthesized $BaTiO_3$ nanocubes, 0.1 g of oleic acid, and 15 mL of heptane into a ball-mill crucible filled with 2 mm $ZrO_2$ balls;
    subjecting the slurry to rotation at 500 rpm for 5 hours;
    converting the resulting nanoparticle suspension to a powder using anhydrous ethanol with sequential washing/drying at ambient temperature.

* * * * *